US009612945B1

United States Patent
Booss et al.

(10) Patent No.: US 9,612,945 B1
(45) Date of Patent: Apr. 4, 2017

(54) CALL COUNT PROFILING FOR ESTIMATION OF RELATIVE HOTNESS OF FUNCTION CALL FREQUENCY

(71) Applicant: SAP SE, Walldorf (DE)

(72) Inventors: Daniel Booss, Wiesloch (DE); Guenter Radestock, Karlsruhe (DE); Mehul Wagle, Pune (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/949,780

(22) Filed: Nov. 23, 2015

(51) Int. Cl.
G06F 9/44 (2006.01)
G06F 9/45 (2006.01)
G06F 11/36 (2006.01)
G06F 11/34 (2006.01)

(52) U.S. Cl.
CPC ...... *G06F 11/3688* (2013.01); *G06F 11/3466* (2013.01); *G06F 8/443* (2013.01); *G06F 11/3409* (2013.01); *G06F 11/3419* (2013.01)

(58) Field of Classification Search
CPC ............. G06F 11/3466; G06F 11/3409; G06F 11/3419; G06F 2201/865; G06F 11/3636; G06F 8/443
See application file for complete search history.

(56) References Cited

U.S. PATENT DOCUMENTS

| | | | | |
|---|---|---|---|---|
| 7,549,959 B2* | 6/2009 | Takala | ................. | A61B 5/0402 600/300 |
| 8,510,721 B2* | 8/2013 | Dadiomov | .......... | G06F 11/3612 717/131 |
| 8,799,904 B2* | 8/2014 | Kuiper | ................. | G06F 9/4812 717/127 |
| 2006/0075386 A1* | 4/2006 | Loh | ..................... | G06F 11/3466 717/124 |
| 2008/0244533 A1* | 10/2008 | Berg | ................... | G06F 11/3447 717/128 |
| 2010/0235815 A1* | 9/2010 | Maybee | ............. | G06F 11/3636 717/125 |
| 2012/0054721 A1* | 3/2012 | Dadiomov | ......... | G06F 11/3612 717/128 |
| 2012/0072423 A1* | 3/2012 | Morrison | ........... | G06F 11/3466 707/739 |
| 2012/0191893 A1* | 7/2012 | Kuiper | ................. | G06F 9/4812 710/269 |

(Continued)

OTHER PUBLICATIONS

Zhuang et al., "Accurate, efficient, and adaptive calling context profiling", Jun. 2006, ACM, pp. 263-271; <http://dl.acm.org/citation.cfm?id=1134012>.*

(Continued)

*Primary Examiner* — Thuy Dao
*Assistant Examiner* — Ben C Wang
(74) *Attorney, Agent, or Firm* — Mintz Levin Cohn Ferris Glovsky and Popeo, P.C.

(57) ABSTRACT

Instances of a call stack executing in a database management system and separated by a sampling interval can be compared and upwardly traversed until reaching a point of difference between the instances. A call counter can be incremented for each new frame identified in the second instance of the call stack since the point of difference such that relative call count frequencies of multiple frames (which can include function calls) can be determined. Systems, methods, and computer program products are described.

16 Claims, 7 Drawing Sheets

(56) References Cited

U.S. PATENT DOCUMENTS

| | | | |
|---|---|---|---|
| 2013/0249917 A1* | 9/2013 | Fanning | G06T 11/206 345/440 |
| 2014/0282430 A1* | 9/2014 | Kew | G06F 11/34 717/130 |
| 2015/0032884 A1* | 1/2015 | Greifeneder | H04L 67/10 709/224 |
| 2015/0052406 A1* | 2/2015 | Garrett | G06F 11/1448 714/45 |
| 2015/0234869 A1* | 8/2015 | Chan | G06F 17/30312 707/603 |
| 2015/0309915 A1* | 10/2015 | Ajith Kumar | G06F 11/3636 717/128 |

OTHER PUBLICATIONS

David Gnedt, "Fast Profiling in the HotSpot Java VM with Incremental Stack Tracing and Partial Safepoints", Dec. 2014, Johannes Kepler University, pp. 1-51; <http://mevss.jku.at/wp-content/uploads/2015/01/bachelorthesis-gnedt.pdf>.*

Pöttner et al., "All Eyes on Code: Using Call Graphs for WSN Software Optimization", 2013, IEEE, pp. 137-145; <http://ieeexplore.ieee.org/stamp/stamp.jsp?arnumber=6758510>.*

Kirill, Rogozhin. "Calculating Estimated Call Counts with Intel® VTune™ Amplifier XE 2013." *Intel Developer Zone*. N.p., Mar. 18, 2013. Web. Retrieved Oct. 3, 2016. pp. 1-3. <<https://software.intel.com/en-us/articles/calculating-estimated-call-counts-with-intel-vtune-amplifier-xe-2013>>.

* cited by examiner

| Frame Ptr (FP) | # of calls |
|---|---|
| MemoryManager::SmallBlockAllocator::allocate | 1 |
| MemoryManager::PageProvider::allocate | 1 |
| MemoryManager::BigBlockAllocator::allocateSuperpage | 1 |
| MemoryManager::BigBlockAllocator::allocateBlock | 1 |

CALL COUNT PROFILING FOR ESTIMATION OF RELATIVE HOTNESS OF FUNCTION CALL FREQUENCY

TECHNICAL FIELD

The subject matter described herein relates to estimation of function call frequency for functions and/or other computing workloads imposed on a computing system, such as for example a database management system.

BACKGROUND

Performance of computing loads in a computing system, such as for example a database management system (DBMS), can be improved if an intrinsic capability to perform time-based profiling of central processing unit utilization and wait latency incurred by execution of workloads imposed on the computing system is available. In addition, a determination of how often the "hot" routines (e.g. the most frequently used routines) in a function profile output are invoked can also be advantageous in determining how to best optimize the runtime performance of the DBMS. For example, some functions invoked by a DBMS may result in particularly high central processing unit (CPU) utilization because they are called very frequently, while other functions that are not called so often may result in extended runtimes for other reasons (such as, for example, nested programming loops). In the former case, there may be a need to optimize the context of caller functions (e.g. to reduce unnecessary calls to a callee function, or to re-factor a design to reduce unnecessarily repetitive calls). The latter case may be indicative of a need to investigate one or more hot program lines of a callee function to debug slow running pieces of logic.

SUMMARY

Implementations of the current subject matter relate to providing a technique to help diagnose and solve resource use overheads that may result from unnecessarily frequent function calls. In one aspect, a method includes comparing a first sampled instance and a second sampled instance of a call stack executing in a database management system at a first time and a second time separated by a sampling interval. The method further includes upwardly traversing the first sampled instance (i.e. older in time) and the second sampled instance (i.e. newer in time) of the call stack using a bottom-most function or frame in the call stack as a starting point until reaching a difference between the first instance and the second instance, and incrementing a call counter for each new function or frame identified in the second instance of the call stack since the point of difference.

In optional variations, one or more of the following features can be included in any feasible combination. The upwardly traversing of the first instance and the second instance of the call stack can include eliminating of frames which are called in the same order in both of the first instance and the second instance. The call counters for the plurality of frames can be stored in a data structure. The first call stack can occurs on a previous sample run, and a method can further include attaching the first call stack into a heap memory of each executing light weight process thread for the call stack.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a high speed, in-memory database system, it should be readily understood that such features are not intended to be limiting. Additionally, this disclosure uses the term "DBMS" for convenience in describing various examples. However, it will be understood that certain features of the current subject matter may also be applicable to other computing systems since the technique of profiling function call stacks is generic in nature. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 4 shows a table illustrating a state of the counters after a (N+1)th (current) call stack consistent with implementations of the current subject matter;

When practical, similar reference numbers denote similar structures, features, or elements.

DETAILED DESCRIPTION

Figure 1:
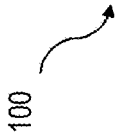
FIG. 1 shows an illustrative example of callstack that triggers increments of exclusive and inclusive times of a sample aggregation phase of a profiler approach.

A profiler is an example of an approach via which function call profiling data can be collected, for example via a stack-based sampling approach in which a dedicated profiler thread of the running process traverses all the executing threads of the process by firing signals and collecting information on the running stack of each thread using a fast custom implementation of unwinding the program stacks. A stack, as the term is used herein, is a call chain, e.g. an order in which functions are called to perform operations on a database. In an analytical environment such as with online analytical processing (OLAP), multiple threads can be involved in query execution. A profiling approach can be especially useful for performance analysis situations that demand higher visibility into the relative execution overheads of data server routines. For a modern, high speed, in-memory database system (such as for example the HANA architecture available from SAP SE of Walldorf, Germany), a profiler technique can be quite fast. With a reasonably high-resolution sampling interval of 1 millisecond (ms) as a minimum profiling interval, the profiler can incur approximately 10% overheads depending on the usage scenario.

The profiling process can be understood by reference to three phases: a data population phase, a sample aggregation phase, and a profile visualization phase. However, it will be understood that the described operations may be performed using fewer (or more) than three distinct phases.

In a data population phase of a profiler, logic is implemented to collect CPU samples associated with function stacks. The profiler regularly iterates over all threads/contexts, but skips "inactive" threads that are either waiting for work and for which no other thread or other database or application component is waiting for results. Next, call stacks of the threads are obtained to allow implicit determinations of whether the thread is in a wait state. The profiler receives User and System time in microseconds via a /proc file system (e.g. a pseudo-file system which provides an interface to kernel data structures for presenting information about processes and other system information in a hierarchical file-like structure, and which can be implemented in some examples as /proc/<pid>/stat) and also stores a wait time for the profiled threads. Threads blocked in critical sections (e.g. synchronization of multiple threads sharing a same resource via a mutex) contribute to the wait time. The call stack can be used as the key in a fast in-memory data structure like hash map, and are mapped to USER/SYSTEM/WAIT times. For example, the user and system time of an executing thread are read on Linux from "cat /proc/7278/stat" from the parameters utime and stime respectively. The utime parameter can indicate an amount of time that a process has been scheduled in user mode, measured in clock ticks (e.g. divide by sysconf(_SC_CLK_TCK)), which can include guest time (time spent running a virtual CPU), so that applications that are not aware of the guest time field do not lose that time from their calculations. The stime parameter can indicate an amount of time that a process has been scheduled in kernel mode, measured in clock ticks (e.g. divide by sysconf(_SC_CLK_TCK)).

A sample aggregation phase can include operations for implementing logic and data structures to aggregate the samples and stacks for the profiler. A map of nodes is created where each frame of any of the call stacks is mapped to an "inclusive" or an "exclusive" time of one of three types: user, system and wait. Only the topmost frame in a call stack contributes to the three "exclusive" times. All other frames, including an artificial "0" frame denoting "root," can contribute to the three "inclusive" times. An "edge" map can be created where each caller frame (parent function) creates an edge to its callee frame (child function). As used herein, a frame can include a call to a function. The edge can be annotated with "inclusive" times from corresponding call stack in hash map. FIG. 1 shows an illustrative example of a call stack 100 that triggers increments of exclusive and inclusive times of a sample aggregation phase of a profiler approach. For the topmost routine (#0), both the <Exclusive> and <Inclusive> counters are incremented. For all the other routines in the stack, only the <Inclusive> counters are incremented.

A profile visualization phase of a profiler approach can include the logic to create a graphical representation (e.g. a *.dot file) to report the profiling result to the end user. A dotty (*.dot) file is created as per the following rules. Only nodes/symbols contributing above a given minimum percentage (e.g. 1%) are retained, while others are filtered and hidden from the report. Additionally, nodes from the node map are printed in dotty format, including the (C++ demangled) frame name, inclusive times, and exclusive times. Two graphs can be created and/or shown: one for waiting threads and the other for busy threads. A "busy" CPU graph can show both system and user times. Edges from the node map can be printed in a dotty format. The label of the edges can be the % fraction of the inclusive time of callee stored in the edge map with respect to the inclusive time of caller. In case of a CPU profile, the inclusive time of the callee would equal a sum total of <User> and <System> times.

Figure 2:
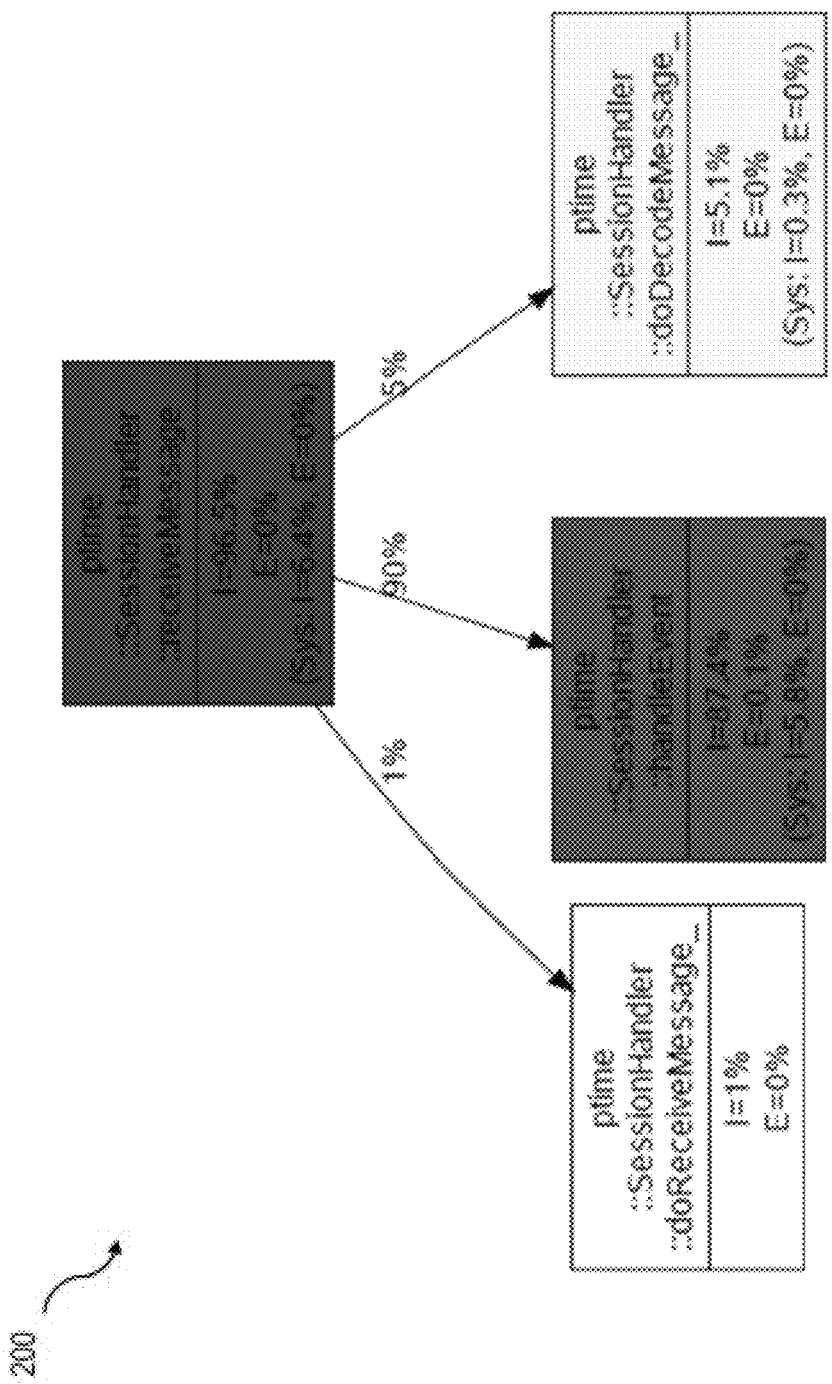
FIG. 2 shows a diagram illustrating features of an example of a CPU profile report created by profiler approach.

FIG. 2 shows a diagram 200 illustrating features of an example of a CPU profile report created by profiler approach. The CPU profile report is generated with external user commands run within an administrator utility usable by a database administrator (e.g. the SAP HANA Console Admin available in the SAP HANA database product available from SAP SE of Walldorf, Germany). Commands available within such a utility can include starting/stopping the profiler, profiler print, and the like. A CPU profile report can contain information about the relative time spent in individual functions and the critical path of hotspots (marked in shades of grey in increasing order of hotness ranging from light shade to darker shade).

In many situations, it may also be found helpful to be able to determine how often the hot routines in a function profile output are invoked. Some functions may have a particularly high percentage of CPU utilization because they are called very frequently, while some others are not called so often but suffer longer runtimes instead. The former is a case in which optimization of the context of callers (e.g. reducing unnecessary calls to a callee, or refactoring a loop-based design to reduce the repetitive calls) may be needed, while the latter is an example in which investigation (or drilldown) into one or more "hot" program lines of the callee and debugging of any slow running pieces of logic is advisable. Superior insights into any CPU related slowdown can be achieved if the profiling tool can also provide estimates on how often a particular function may have been called during a sampling interval. It is also important to control how much of a performance penalty such a feature of function profiler will impose on the query runtime when activated.

Consistent with some implementations of the current subject matter, a stack-based sampling approach can include treating each consecutive instance of a call stack from the topmost function to the bottommost as a single call, and different stacks as new calls. Though the number of calls estimated with such a method may be several magnitudes lower than the actual value, the resultant count can be helpful in situations requiring relative comparisons (e.g. Run A vs Run B). A potentially valuable advantage of such approach in certain high-speed in-memory DBMS implementations (such as for example SAP HANA) is the ability to sample a fixed thread and compare the stack routines across readings to detect any plausible changes that suggest and possibly imply call boundaries. A light weight process (LWP) thread-based model can result in a significant advantage in terms of such event-based inference techniques. The feature may be externally activated using an additional switch interface (call count=ON|OFF) added with the profiler's start command. For instance, an example of pseudocode for implementing call count features via an administrative command interface, such as is discussed above, can be expressed as hdbcons> profiler start --callcount on.

In some implementations of the current subject matter that include a call count feature, a call stack from a last sample run can be attached into the heap memory of each executing LWP thread. During the next sample run, for each thread the previous call stack can be compared versus a current call stack for the thread. The shared portion of a call stack (e.g. as viewed in a bottom-up order of call sequence) can be ignored for purposes of the relative call-count estimation, while the remainder portion from the later call stack is interpreted as "new" and "interesting" events and used for populating the call counts.

Figure 3A:
FIG. 3A and FIG. 3B show an example of a previous and a current call stack in a profiler approach enhanced with "call count" profiling feature, respectively.
Figure 3B:

This approach can be better understood by reference to a "previous" (e.g. older) call stack #(N) 300 and a "current" (e.g. newer) call stack #(N+1) 350 shown respectively in FIG. 3A and FIG. 3B. The unbolded frames in the two stacks (#5 to #8 in the previous call stack 300 and #4 to #7 in the current call stack 350) are identical, starting from the root until the first different frame (an example of an "excluded" frame). For the bolded frames in the current call stack 350, the number of calls is increment by +1 in a structure "map<void*, size_t>" that maps <frame pointer> to <# of calls>. The table 400 in FIG. 4 illustrates a state of the counters after a (N+1)th call stack (e.g. the current call stack 350 in FIG. 3B) assuming these functions were never called before.

As noted before, the approach used in implementations of the current subject matter is sample-based technique in which the "sampled call count" is usually far lower than "real call count". The measurement is nevertheless valuable, for example in a case in which there is a need to check whether there an infinite loop within a routine or if it is instead genuinely called several times. The former scenario would show a negligible call count, while the latter would reflect a very high estimated value. It may be noted that compiler-inlined functions would not show up in profiling reports, and would instead contribute to the caller's runtime (or call counts).

Figure 5:
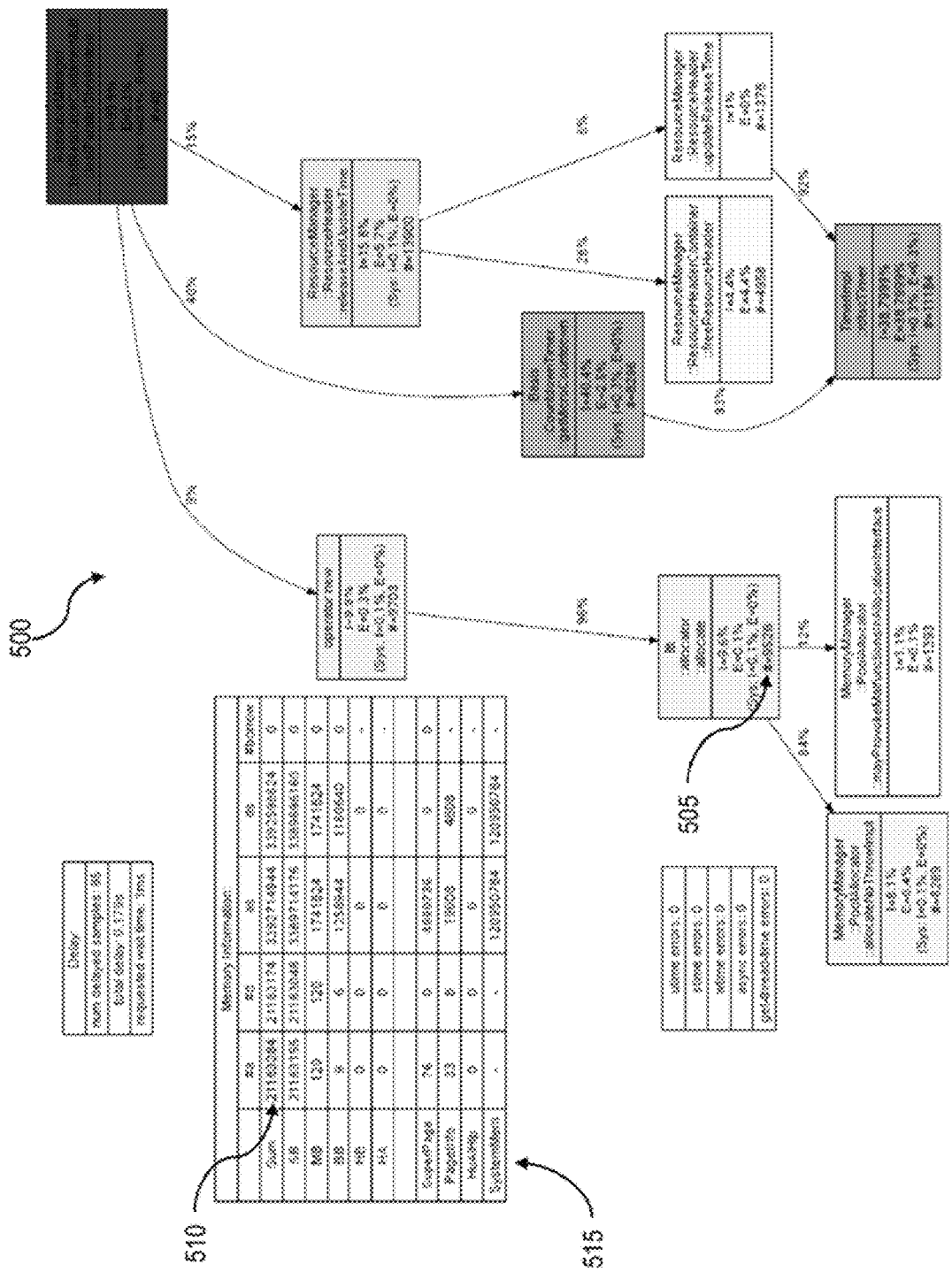
FIG. 5 shows a diagram illustrating a node graph listing results of a profiler approach enhanced with call count profiling consistent with implementations of the current subject matter.

FIG. 5 shows a diagram illustrating a node graph 500 listing results of a profiler approach enhanced with call count profiling consistent with implementations of the current subject matter. As can be seen from comparison of the call count 505 for the function ltt::allocator::allocate in the node graph 500, which represents the estimated number of calls to allocators of a Memory Manager, with the value 510 in the table 515 labeled Memory Information, which corresponds to a cell position with a row named "Sum" and a column named "#a" representing an actual number of allocation calls for this function, there is a sizable difference between the two values. The reason behind this difference is the use of a user-specified non-zero sampling interval (e.g. ≥1 milliseconds) of delay induced between collections of two successive call stacks by the profiler. Doing so can result in loss of the new samples that might have executed on top (or intermediate portions) of the stack within this sampling interval. Such continuous changes in the call chain would never be captured, since an approach consistent with implementations of the current subject matter only looks at two end points of a sampling window and compares the respective stack frames at those positions.

Reducing the sampling interval to a near-zero wait generally improves the accuracy of counts by a tiny margin. For example, the call count of ltt::allocator::allocate in the above example may be improved by about 4% with such a change. This small benefit in accuracy may result because a single iteration of the stack collection across all threads itself adds up a non-trivial delay. However, in other implementations in which the overhead of the callstack collection across all threads can be further minimized, a higher boost in the accuracy of estimated call counts may be obtained by reducing the sampling interval. However, it should be noted that this increased accuracy can come at a price of higher overheads imposed by the profiler on the query runtimes.

Figure 6:
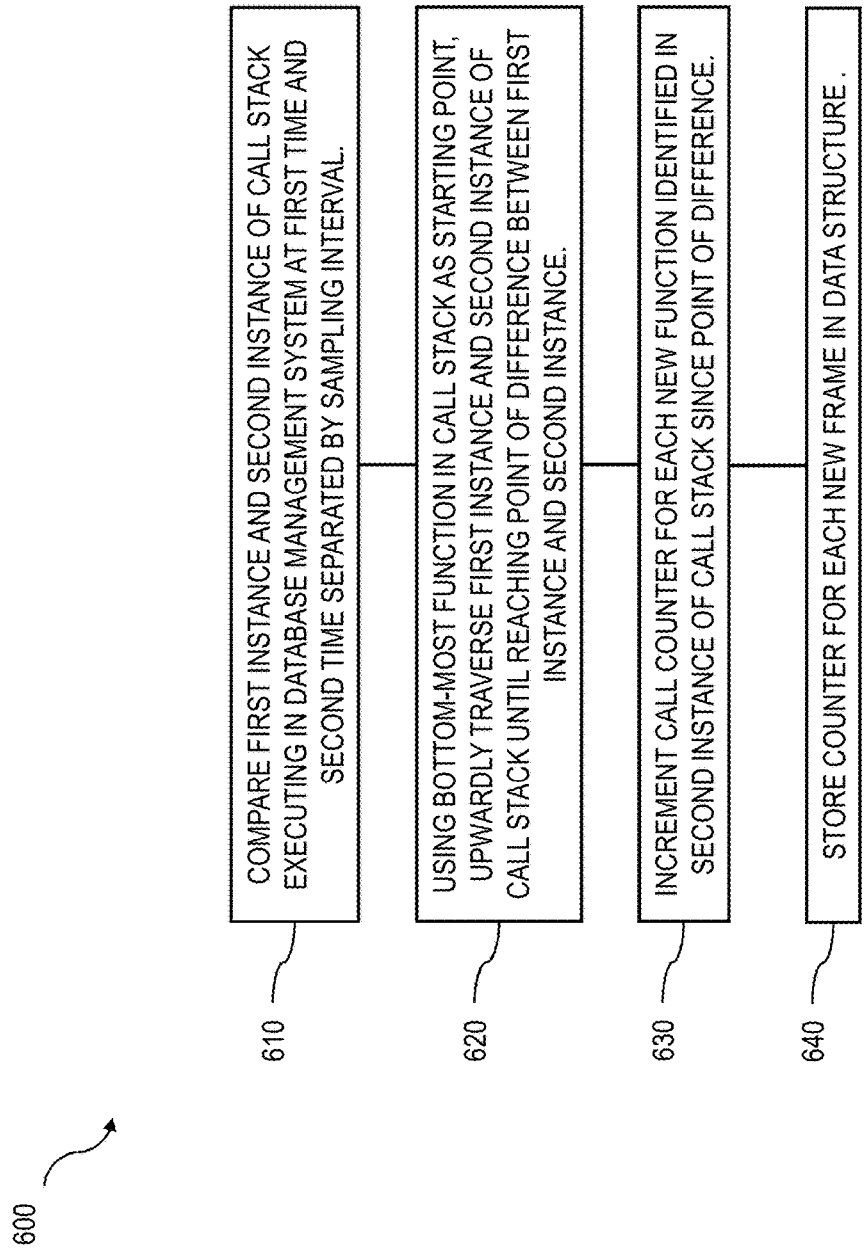
FIG. 6 shows a process flow diagram illustrating aspects of a method having one or more features consistent with implementations of the current subject matter.

FIG. 6 shows a process flow chart 600 illustrating features of a process constituent with implementations of the current subject matter. At 610, a first instance and a second instance of a call stack executing in a database management system are compared at a first time and a second time separated by a sampling interval. Using a bottom-most frame in the call stack as a starting point, the first instance and the second instance of the call stack are upwardly traversed at 620 until reaching a point of difference between the first instance and the second instance. A call counter is incremented at 630 for each new frame identified in the second instance of the call stack since the point of the difference. At 640, the call counters for each of the new frames (and for any other frame for which a counter exists) can be stored in a data structure, which can be a fast internal data structure such as a hashmap. Relative call count frequencies can be estimated based on the call counters for the plurality of frames, and such information can optionally be displayed graphically using an approach similar to those depicted in FIG. 5.

Implementations of the current subject matter can provide a variety of technical advantages. For example, the provided sampling method to estimate function call counts of multi-threaded programs is low cost (in terms of CPU and/or memory usage) relative to other possible solutions. The current subject matter provides a DBMS-integrated (internal) profiler with add-on of counting capability that neither relies on external nor third-party tools nor requires special permission (e.g. superuser or the like) to initiate profiling. No hardware or platform assumptions are required (as can be the case with an external solution, such as for example external solutions like the Vtune product available from Intel Corporation of Santa Clara, Calif.). Such external solutions can calculate call counts statistically (e.g. exact call count values are not generated). A 'zero' value means that the function was called just a relatively few times and there might still be 100s (or 1000s) of calls. Additionally, call count collection for such solutions is generally done using hardware counters and hence imposes additional overheads of 20% or more, albeit much lower than the situation if precise call counts were collected with binary instrumentation or using debugger (e.g. GDB).

The provided solution can work seamlessly across various specific Linux implementations. Additionally, the solution does not require use of any special library or system calls, instead relying completely on an event detection mechanism using a conventional program call stack. Because the stack is collected using custom code (C/ASM) it can be unwound very quickly. The provided intrinsic application-based profiler does not require special installations, usage trainings, license costs, or the like. The results can be easily collected by customer-side DBAs/Analysts and reported to DBMS product engineering teams to help debug cases of performance slowdown.

Figure 7:
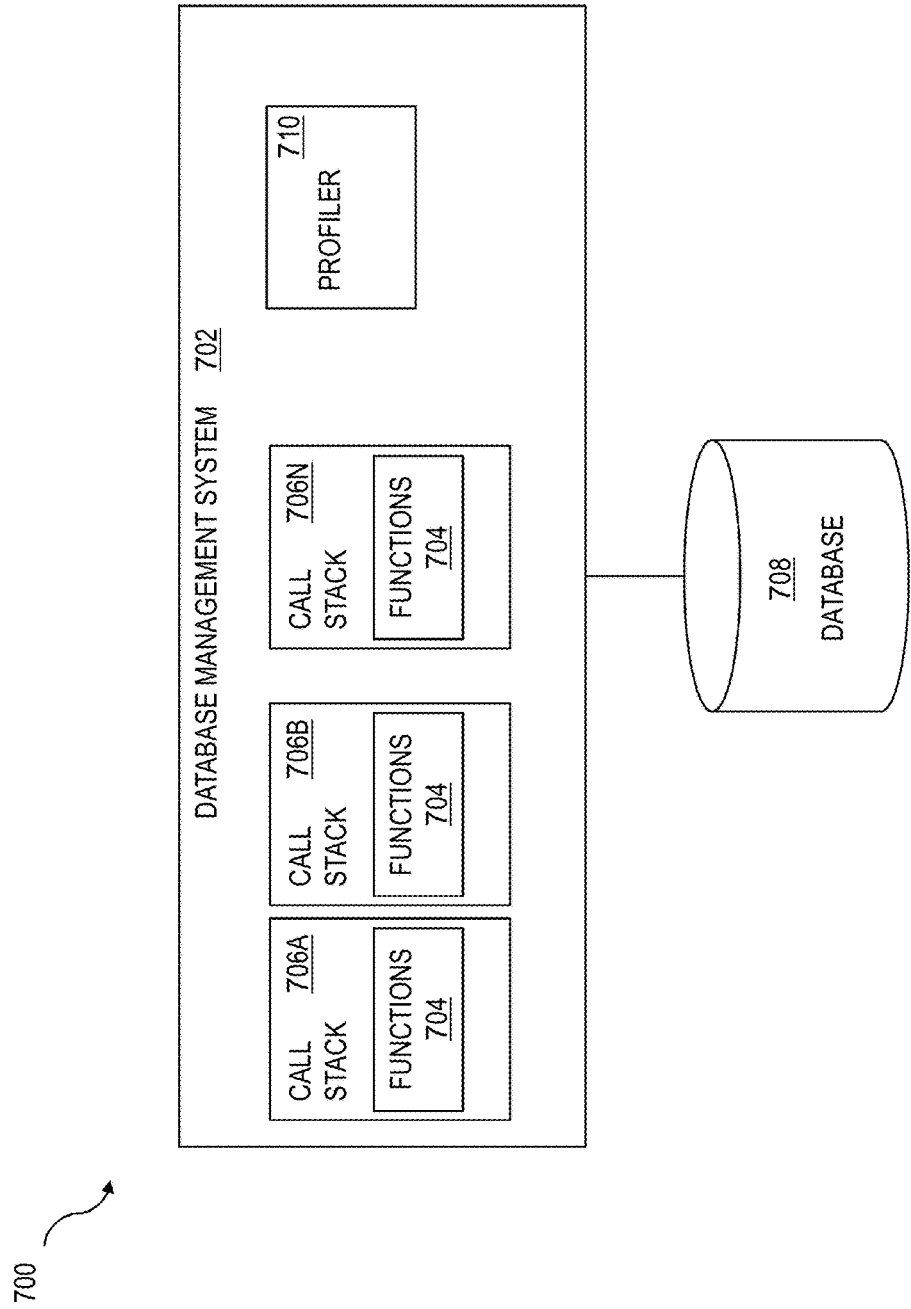
FIG. 7 shows a diagram illustrating aspects of a system showing features consistent with implementations of the current subject matter.

FIG. 7 shows a diagram illustrating various features of an example computing environment 700 in which the current subject matter can be implemented. A database management system 702 can include various functions 704 that can be called in various orders as part of call stacks 706A, 706B, . . . , 706N to perform operations on a database 708. A profiler 710 can be executed on the one or more processors executing the features of the DBMS 702, and can implement one or more of the features described above.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method to be performed on one or more data processors comprising at least part of a computer system, the method comprising:

comparing a first instance of a call stack and a second instance of the call stack, the first instance of the call stack being executed in a database management system at a first time and the second instance of the call stack being executed in the database management system at a second time, the first time and the second time being separated by a sampling interval, and the comparing including upwardly traversing, starting from the bottom-most frame in the first instance and the second instance of the call stack, the first instance and the second instance of the call stack;

identifying, based at least on the comparing, a first frame at which the first instance of the call stack differs from the second instance of the call stack; and incrementing a call counter for each frame that is subsequent to and upwards from the first frame in the second instance of the call stack.

2. A method as in claim 1, wherein the upwardly traversing of the first instance and the second instance of the call stack comprises identifying one or more frames that are called in the same order in both the first instance and the second instance of the call stack.

3. A method as in claim 1, further comprising storing the call counters for the plurality of frames in a data structure.

4. A method as in claim 1, further comprising estimating, based at least on the call counters, a relative call count frequency between the first instance of the call stack and the second instance of the call stack.

5. A method as in claim 1, wherein the first instance of the call stack is generated on a previous sample run, and wherein the operations further comprise attaching the first instance of the call stack into a heap memory of each executing light weight process thread for the call stack.

6. A system comprising:
computer hardware comprising at least one programmable processor configured to perform operations comprising:
comparing a first instance of a call stack and a second instance of the call stack, the first instance of the call stack being executed in a database management system at a first time and the second instance of the call stack being executed in the database management system at a second time, the first time and the second time being separated by a sampling interval, and the comparing including upwardly traversing, starting from the bottom-most frame in the first instance and the second instance of the call stack, the first instance and the second instance of the call stack;

identifying, based at least on the comparing, a first frame at which the first instance of the call stack differs from the second instance of the call stack; and incrementing a call counter for each frame that is subsequent to and upwards from the first frame in the second instance of the call stack.

7. A system as in claim 6, wherein the upwardly traversing of the first instance and the second instance of the call stack comprises identifying one or more frames that are called in the same order in both the first instance and the second instance of the call stack.

8. A system as in claim 6, wherein the operations further comprise storing the call counters for the plurality of frames in a data structure.

9. A system as in claim 6, wherein the operations further comprise estimating, based at least on the call counters, a relative call count frequency between the first instance of the call stack and the second instance of the call stack.

10. A system as in claim 6, wherein the first instance of the call stack is generated on a previous sample run, and wherein the operations further comprise attaching the first instance of the call stack into a heap memory of each executing light weight process thread for the call stack.

11. A system as in claim 6, wherein the computer hardware further comprises a machine-readable medium storing instructions that, when executed by the processor, cause the at least one programmable processor to perform at least some of the operations.

12. A computer program product comprising a non-transitory machine-readable medium storing instructions that, when executed by at least one programmable processor, cause the at least one programmable processor to perform operations comprising:
comparing a first instance of a call stack and a second instance of the call stack, the first instance of the call stack being executed in a database management system at a first time and the second instance of the call stack being executed in the database management system at a second time, the first time and the second time being separated by a sampling interval, and the comparing including upwardly traversing, starting from the bottom-most frame in the first instance and the second instance of the call stack, the first instance and the second instance of the call stack;

identifying, based at least on the comparing, a first frame at which the first instance of the call stack differs from the second instance of the call stack; and incrementing a call counter for each frame that is subsequent to and upwards from the first frame in the second instance of the call stack.

13. A computer program product as in claim 12, wherein the upwardly traversing of the first instance and the second instance of the call stack comprises identifying one or more frames that are called in the same order in both the first instance and the second instance of the call stack.

14. A computer program product as in claim 12, wherein the operations further comprise storing the call counters for the plurality of frames in a data structure.

15. A computer program product as in claim 12, wherein the operations further comprise estimating, based at least on the call counters, a relative call count frequency between the first instance of the call stack and the second instance of the call stack.

16. A computer program product as in claim 12, wherein the first instance of the call stack is generated on a previous sample run, and wherein the operations further comprise attaching the first instance of the call stack into a heap memory of each executing light weight process thread for the call stack.

* * * * *